United States Patent [19]

Okazaki et al.

[11] 4,087,592
[45] May 2, 1978

[54] WAFER SUPPLY STRUCTURE FOR LIQUID STORAGE BATTERY

[75] Inventors: Ichiro Okazaki; Kazumi Nishida, both of Kyoto, Japan

[73] Assignee: Japan Storage Battery Company Limited, Kyoto, Japan

[21] Appl. No.: 788,947

[22] Filed: Apr. 19, 1977

[51] Int. Cl.$^2$ ............................................. H01M 2/36
[52] U.S. Cl. ........................................ 429/63; 429/78; 429/88
[58] Field of Search ........................ 429/63, 73, 78, 88

[56] References Cited

U.S. PATENT DOCUMENTS 1,848,035  3/1932  Van Meter .............................. 429/78

FOREIGN PATENT DOCUMENTS 2,502,369  7/1975  Germany .............................. 429/63
   35,458  7/1968  Japan .................................... 429/63
  437,447 11/1967  Switzerland ........................... 429/63

Primary Examiner—Donald L. Walton
Attorney, Agent, or Firm—Sughrue, Rothwell, Mion, Zinn and Macpeak

[57] ABSTRACT

A sealed water supply chamber 18 for a battery vessel 1 is formed by thermally bonding together the vessel, a lid member 2 having a plurality of vertically disposed level defining tubes 11, water inlet and gas outlet ports 12, and water pools or reservoirs 14 at each end, and a cover member 3 having threaded openings 16 at each end and downwardly depending cups 13 disposed above the respective tubes 11. Tight bonding is facilitated by molding the vessel, the lid member, and the cover member from the same thermoplastic material. L-shaped water inlet and outlet pipes 4 are screwed into the openings 16 and sealed by rubber packings 15, with the lower end of each pipe disposed just above the bottom of a water reservoir 14. Surplus water remaining in the reservoirs thus provides a gas barrier to isolate the chambers 18 of a plurality of batteries connected in an array, whereby a gas explosion in one battery cannot flash through the water connecing pipes to ignite the other batteries.

5 Claims, 11 Drawing Figures

WAFER SUPPLY STRUCTURE FOR LIQUID STORAGE BATTERY

BACKGROUND OF THE INVENTION

This invention relates to a structure for adding water to storage batteries in a safe manner whereby the liquid level is automatically controlled by the inner pressure within each battery and wherein the gases in each battery are isolated from adjacent batteries by water barriers.

In conventional batteries, adhesive materials and/or rubber packings have been used to tightly seal the water supply chambers. However, such seals are relatively complex in structure and difficult to produce, and they are often subject to small leakages which disrupts or disables the water fill function. Further, when a plurality of storage batteries are connected in series and/or parallel, as for an electric car or train installation, a great deal of time is required to sealingly connect each of the batteries and to add water thereto. Specifically, water pipes must be connected in the longitudinal and perpendicular directions of the battery array, and L or U-shaped pipes must be used to implement the perpendicular connections at the ends of the array. Further, the plurality of batteries commonly have high voltage and storage capacities, and since their interior spaces communicate with each other through the water pipe connections, if an explosion occurs in one cell due to inside or outside ignition by leakage current arcing or the like, all of the batteries may be sympathetically exploded, which creates a potential danger or hazard.

The gases generated in the respective batteries are exhausted to the atmosphere through a single discharge via an explosion preventing filter made of sintered aluminum or the like in order to prevent the batteries from exploding due to any flash ignitions in the atmosphere. However, if one cell explodes due to inside ignition, the explosion may easily propogate to all of the batteries. As an example, if a high voltage is applied to the relatively small area of a water connecting pipe, leakage current may flow therethrough if the inside of the pipe is damp due to surplus water remaining from a water fill operation or due to condensed acid moisture from the batteries during charging. If such dampness or moisture is discontinuous, arc ignition may occur and cause the batteries to simultaneously explode.

SUMMARY OF THE INVENTION

It is therefore an object of the present invention to overcome the above-mentioned drawbacks of the conventional apparatusses and to provide a storage battery construction having a simple but positively sealed water supply structure.

It is an another object of the present invention to provide such a storage battery wherein the water supply structure may be easily connected to that of adjacent batteries, whereby a plurality of batteries can readily be mounted in an electric car or train.

It is still another object of the present invention to provide such a storage battery wherein the water interconnection pipes between adjacent batteries provide isolating water barriers, to thereby avoid explosive communication between the batteries.

Briefly, according to the present invention a tightly sealed water supply chamber is provided by joining two separate elements into one unit by heat bonding, one element being a lid member made of thermo-plastic resin such as polypropylene and polyethylene, with which some parts of the water supply structure, such as liquid level defining tubes and water supplying ports, are integrally molded, and the other element being a cover member made of the same material as the lid member.

Further, according to the present invention, threaded female members are provided at both ends of the water supply chamber to engage threaded male connecting pipes through rubber packings of selective thickness, whereby each connecting pipe can be rotationally disposed in any desired direction by using a rubber packing of proper thickness. Alternatively, each connecting pipe can be rotated to a desired direction by using a swan screw coupling (bayonet joint).

Furthermore, in the present invention water pools are provided below the ends of the respective connecting pipes and accumulate residual water during each water supply operation, whereby any explosive gases generated in the battery during use are exhausted through the water pools as discontinuous gas bubbles and any atmospheric flashes are thus isolated or blocked by the water.

DETAILED DESCRIPTION OF THE PREFERRED EMBODIMENT

Figure 1:
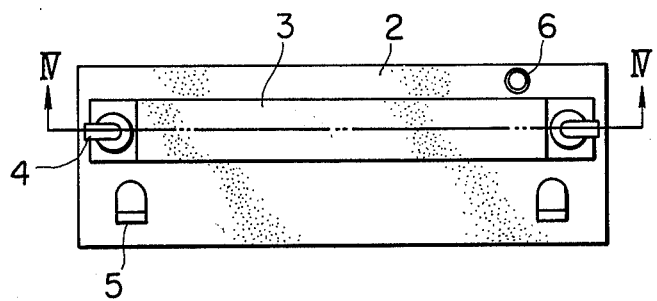
FIG. 1 shows a plan view of a mono-block battery according to the present invention.
Figure 2:
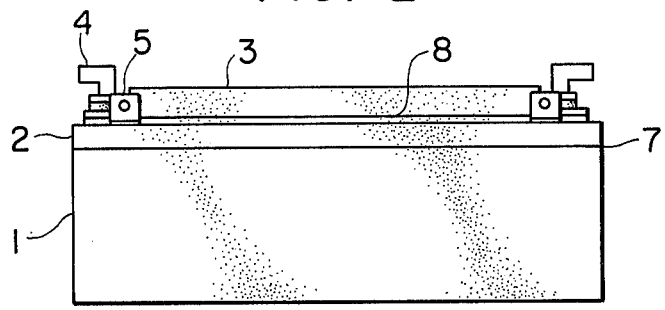
FIG. 2 shows a front view thereof.
Figure 3:
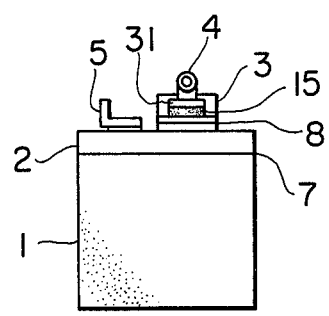
FIG. 3 shows a side view thereof.

FIGS. 1–3 show top, front, and side views, respectively, of a mono-block battery according to the present invention wherein the battery vessel 1 is made of a thermoplastic resin, such as polypropylene and/or polyethylene.

Figure 4:
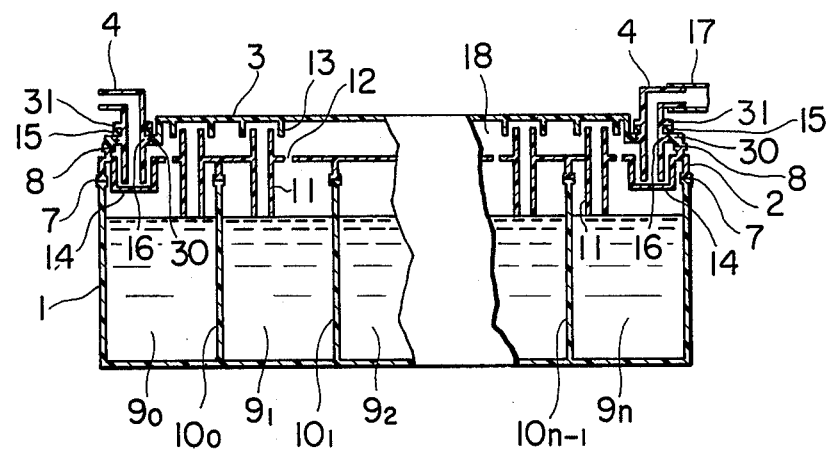
FIG. 4 shows a cross-sectional elevation taken along line IV—IV of FIG. 1.

As best seen in FIG. 4, the vessel 1 is divided into a plurality of individual cells $9_o$–$9_n$ by a plurality of partition walls $10_o$–$10_{n-1}$ integrally molded therewith. A lid member 2 made of the same material as the vessel 1 integrally includes a plurality of liquid level defining tubes 11 adapted to be vertically disposed in the respective battery cells, an equal plurality of ports 12 for supplying water to and exhausting gas from each cell, a pair of water pools 14 respectively disposed at both ends of the lid member, and projecting upper and lower bonding skirts 8, 7, respectively, the latter adapted to be thermally bonded to the upper edge of the vessel 1. An acid supplementing and liquid level sensing port 6 is also provided in the lid member. A cover member 3 includes a plurality of downwardly depending annular cup members 13 respectively surrounding each liquid level defining tube 11, and a pair of threaded female members 16 disposed above the water pools 14. The cover member 3 is dimensioned to mate with the lid member 2 whereby the lower edge of the cover member may be thermally bonded to the upper skirt 8 of the lid member.

In the manufacture and assembly of the battery, the anode plates, cathode plates and separators are secured together in the usual manner, and the resulting electrode groups (not shown) are mounted in the respective cells $9_o$-$9_n$. The partition walls $10_o$-$10_{n-1}$ are then penetrated or pierced as necessary in order to electrically connect the electrodes in the respective cells with each other. Thereafter, the upper edge of the vessel 1 is thermally bonded to the lower skirt 7 of the lid member to form an air-tight seal. The lower edge of the cover member 3 is then thermally bonded to the mating upper skirt 8 of the lid member 2, whereby a sealed water supply chamber 18 is formed.

The functional interrelationship between the tubes 11, ports 12, and cup members 13 to control the liquid fill level within the battery cells via internal pressure balances within the chamber 18 will not be described herein since same is old in the art and forms no part of the present invention. A detailed explanation thereof can be found, for example, in German OLS 2,303,244 published on July 25, 1974.

Figure 5A:
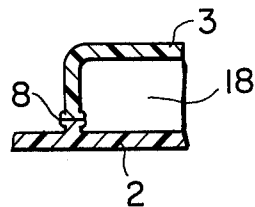
FIGS. 5A–C show enlarged cross sectional views of various thermal bond arrangements between the lid member and the cover member according to the present invention.
Figure 5B:
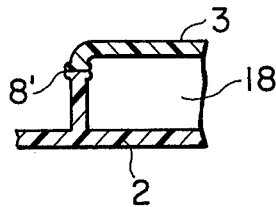
Figure 5C:
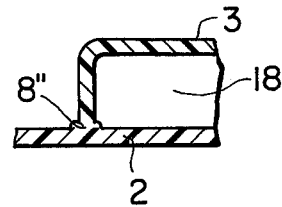

FIGS. 5A-C show three embodiments of thermally bonding the lid member and the cover member together. As may be seen, the upper skirt 8 is not limited to a low projection, as in FIG. 5A, but may extend up to the cover member surface as at 8' (FIG. 5B), or terminate adjacent the lid member surface as at 8" (FIG. 5C). Further, as shown in FIG. 5C, the bond area need not be projected, but can also be made on a flat surface. Thus, the cover member 3, the lid member 2, and the vessel 1 are integrally thermally bonded together, and since the same material is used to initially mold or fabricate the three parts, the mechanical strength, air-tightness, and productivity of the battery is greatly enhanced.

The threaded male portion 30 of an L-shaped connecting pipe 4 is engaged with each threaded female member 16 to implement the water pipe connections. A flange 31 is integrally molded with each pipe 4, and a rubber packing 15 is sealingly disposed between the flange and the female member. The length of each pipe 4 below the flange is dimensioned such that its lower end is positioned just above the bottom of a water pool 14. Thus, water supplied through one of the pipes 4 enters the chamber 18 through a water pool 14, and drops into the respective cells through the ports 12. Similarly, water is discharged from the other pipe 4 through the other water pool 14 to supply water to the next or adjacent battery. Upon the completion of the water supply operation, since water still exists in the respective pools 14 any gas generated during charging must exit through the water in the pools in the form of discontinuous bubbles, which effectively isolates the batteries from each other and prevents their sympathetic explosion.

Figure 6:
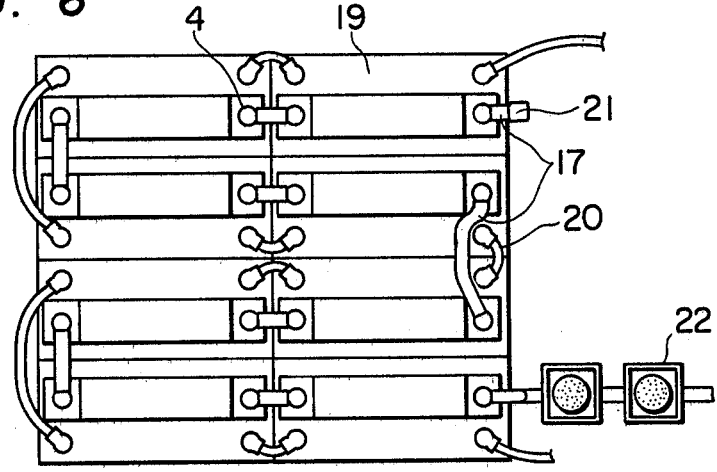
FIG. 6 shows a plan view of eight batteries having their electrical terminals and water supply chambers connected together according to the present invention, for use in an electric car or the like, FIG. 7 shows a front view of FIG. 6.
Figure 7:
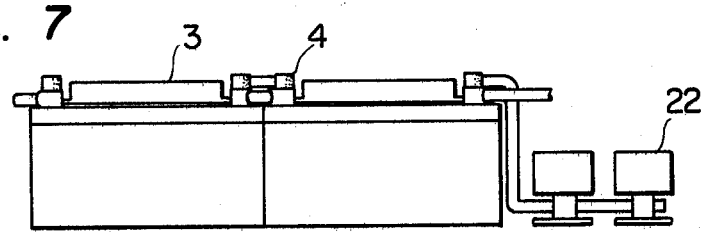

FIGS. 6-7 show an installation of mutually connected batteries for use in an electric train, car, golf cart, etc., wherein eight batteries 19 are electrically connected in series by cables 20. The water supply system is also connected in a series manner by synthetic resin tubes 17 coupled between adjacent pipes 4. The first battery in the block is connected to a water supply pipe 21, and the last battery is connected to an explosion preventing device 22 for exhausting gas and discharging water. The water supply pipe 21 is coupled in an airtight manner to maintain the pressure balances within the batteries.

To implement the extension of a connecting pipe 4 to a selected one of four different directions (0°, 90°, 180°, 270°), four types of rubber packings 15 having four different thicknesses are used, and each thickness difference corresponds to a ¼ pitch of the threads between the female and male coupling. Alternatively, a single packing can be used together with a swan screw coupling, whereby the connecting pipes 4 can be rotated to a desired direction.

To avoid the application of a high voltage to a single one of the connecting pipes, not only are the water supply chambers 18 arranged in parallel on the respective batteries, but the pipes 4 are also interconnected in parallel to the connections between the battery terminals, whereby only the relatively low voltage from a single battery can ever be applied to a given connecting pipe.

Figure 8:
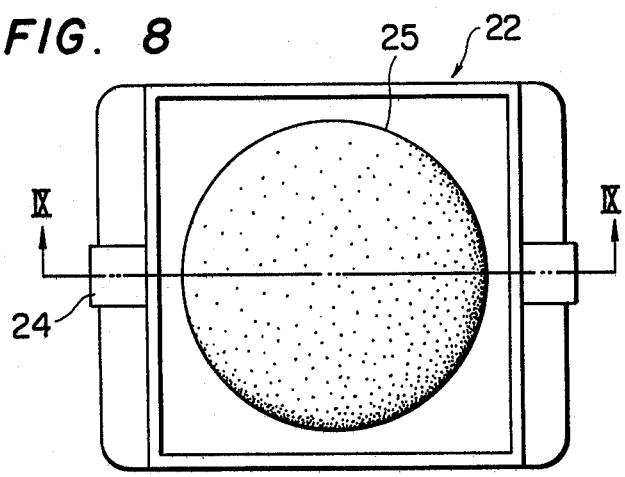
FIG. 8 shows a plan view of a water-exhausting and gas-discharging device.
Figure 9:
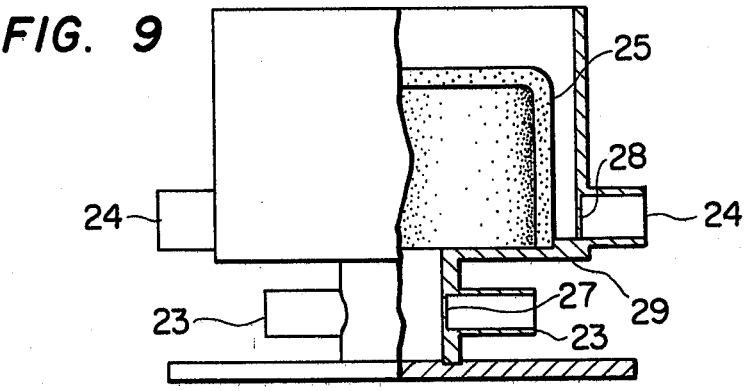
FIG. 9 shows a partial cross-sectional view taken along the line IX—IX of FIG. 8.

FIGS. 8-9 show an explosion preventing device for exhausting generated gas and discharging excess water. Reference numerals 23, 23' designate inlet and outlet pipes, respectively, the former being connected to a pipe 4 on the last battery in the block. Gas generated in the batteries and overflow water from the water fill or supply operations are introduced into the device 22 through the pipe 23. The gas is discharged to the atmosphere through a porous filter 25 made of sintered aluminum or synthetic resin, and the surplus water is discharged from a pipe 24 via the filter 25. If the filter is aluminum it may be adhesively bonded to a resin base member 29, or alternatively it may be heated to a temperature higher than the melting point of the base member and then pressed into the latter to form a thermal bond therebetween. Membranes 27, 28 are provided to block the outlet openings of the pipes 23', 24, respectively. In operation, these membranes are selectively ruptured to implement the series connection of another device 22, as determined by the number of batteries in the array. Since the discharge pipe 24 is disposed above the inlet pipe 23 a pool of water always remains in the reservoir below the filter, which serves to protectively isolate the gases in the battery system from the outside atmosphere.

The swan screw coupling may take any form well known in the art, such as a bayonet joint wherein the threaded openings 16 are each replaced by an opening having four inwardly projecting, downwardly camming bayonet threads on its inner periphery, each such thread spanning an angle of 45° and being spaced from the adjacent threads by 45° openings. The pipes 4 then each have a rubber packing 15 below the flange 31, and the male threads 30 are replaced by four outwardly projecting bayonet threads having a spacing and inclination corresponding to those in the openings 16.

What is claimed is:
1. A liquid storage battery, comprising:
(a) a battery vessel divided into a plurality of cells by a plurality of partition walls integral with said vessel,
(b) a lid member disposed on top of said vessel and thermally bonded thereto to form a tight seal therewith around the entire periphery thereof, said lid member having integrally formed therein a plural- ity of vertically disposed liquid level defining tubes individually extending downwardly into the respective cells and upwardly above the surface of the lid member, and a plurality of water supply and gas discharge apertures individually disposed above the respective cells, (c) a cover member disposed on top of said lid member and thermally bonded thereto to form a tight seal therewith around the entire interface therebetween, said cover member being spaced from said lid member to define a water supply chamber therebetween and having integrally formed therein a plurality of downwardly depending annular cup members individually disposed around the upper ends of the respective tubes, and a pair of openings at the opposite ends thereof, (d) a pair of water supply pipes individually and sealingly engaged in the respective cover member openings and extending downwardly therefrom to terminate within the water supply chamber, (e) said vessel, lid member, and cover member being formed of the same thermoplastic material to implement their tight thermal bonding, and (f) gas/water discharge separator means sealingly coupled to one of said water supply pipes, said separator means comprising a discharge water reservoir, an inlet pipe communicating between said one water supply pipe and said water reservoir, a porous filter member disposed above said reservoir, a discharge water chamber disposed around said filter member and isolated from said discharge water reservoir thereby, and water outlet means disposed in said discharge water chamber above said inlet pipe.

2. A liquid storage battery as defined in claim 1, further comprising a pair of water reservoirs disposed at the opposite ends of said lid member, wherein said cover member openings are individually disposed above the respective reservoirs, and wherein said water supply pipes terminate within the reservoirs and above the bottoms thereof, whereby surplus water within said reservoirs forms a pair of water traps with said supply pipes to isolate said water supply chamber from the outside.

3. A liquid storage battery as defined in claim 2, wherein said water supply pipes are L-shaped and are threadingly engaged in said cover member openings through rubber packings of selected thickness, whereby the horizontal end of each pipe may be oriented in a desired direction.

4. A liquid storage battery as defined in claim 2, wherein said water supply pipes are L-shaped and are threadingly engaged in said cover member openings through rubber packings and swan screw couplings, whereby the horizontal end of each pipe may be oriented in a desired direction.

5. A plurality of liquid storage batteries as defined in claim 1 disposed in an ordered array, a plurality of electrical cables individually connected between respective terminal pairs of adjacent batteries, and an equal plurality of coupling tubes individually and sealingly connected between respective water supply pipe pairs of adjacent batteries and generally disposed parallel to said electrical cables.

* * * * *